US011579850B2

(12) United States Patent
Sun et al.

(10) Patent No.: US 11,579,850 B2
(45) Date of Patent: Feb. 14, 2023

(54) METHOD FOR GENERATING WEB CODE FOR UI BASED ON A GENERATIVE ADVERSARIAL NETWORK AND A CONVOLUTIONAL NEURAL NETWORK (71) Applicant: YANGZHOU UNIVERSITY, Jiangsu (CN)

(72) Inventors: Xiaobing Sun, Jiangsu (CN); Yong Xu, Jiangsu (CN); Bin Li, Jiangsu (CN)

(73) Assignee: YANGZHOU UNIVERSITY ( * ) Notice: Subject to any disclaimer, the term of this patent is extended or adjusted under 35 U.S.C. 154(b) by 0 days.

(21) Appl. No.: 17/622,698

(22) PCT Filed: Apr. 21, 2020

(86) PCT No.: PCT/CN2020/085880
§ 371 (c)(1),
(2) Date: Dec. 23, 2021

(87) PCT Pub. No.: WO2020/259036
PCT Pub. Date: Dec. 30, 2020

(65) Prior Publication Data
US 2022/0261226 A1 Aug. 18, 2022

(30) Foreign Application Priority Data
Jun. 26, 2019 (CN) .......................... 201910562411.2

(51) Int. Cl.
G06F 8/38 (2018.01)
G06F 40/143 (2020.01)
(Continued)

(52) U.S. Cl.
CPC .............. *G06F 8/38* (2013.01); *G06F 40/143* (2020.01); *G06N 3/0454* (2013.01);
(Continued)

(58) Field of Classification Search
CPC ........ G06F 8/38; G06F 40/143; G06F 16/986; G06N 3/0454; G06N 3/0481;
(Continued)

(56) References Cited

U.S. PATENT DOCUMENTS

2013/0227446 A1  8/2013  Zala et al.
2017/0091692 A1* 3/2017  Guo ..................... G06V 30/413
(Continued)

FOREIGN PATENT DOCUMENTS

CN    102170446 A    8/2011
CN    105930159 A    9/2016
(Continued)

OTHER PUBLICATIONS

Rho et al. (Designing nanophotonic structures using conditional deep convolutional generative adversarial networks, published May 22, 2019) (Year: 2019).*

(Continued)

Primary Examiner — Shahid K Khan
Assistant Examiner — Ahamed I Nazar
(74) Attorney, Agent, or Firm — Dentons Cohen & Grigsby P.C.

(57) ABSTRACT

Provided is a method for generating web codes for a user interface (UI) based on a generative adversarial network (GAN) and a convolutional neural network (CNN). The method includes steps described below. A mapping relationship between display effects of a HyperText Markup Language (HTML) element and source codes of the HTML element is constructed. A location of an HTML element in an image I is recognized. Complete HTML codes of the image I are generated. The similarity between manually-written HTML codes and the generated complete HTML codes and the similarity between the image I and an image $I_1$ generated by the generated complete HTML codes are (Continued)

obtained. After training, an image-to-HTML-code generation model M is obtained. A to-be-processed UI image is input into the model M so as to obtain corresponding HTML codes. According to the method of the present disclosure, an image-to-HTML-code generation model M can be obtained.

12 Claims, 3 Drawing Sheets

(51) Int. Cl.
*G06T 7/73* (2017.01)
*G06N 3/08* (2006.01)
*G06V 10/25* (2022.01)
*G06V 10/82* (2022.01)
*G06V 10/77* (2022.01)
*G06V 10/74* (2022.01)
*G06N 3/04* (2023.01)

(52) U.S. Cl.
CPC ............ *G06N 3/0481* (2013.01); *G06T 7/73* (2017.01); *G06V 10/25* (2022.01); *G06V 10/761* (2022.01); *G06V 10/7715* (2022.01); *G06V 10/82* (2022.01); *G06T 2207/20084* (2013.01); *G06T 2207/30176* (2013.01)

(58) Field of Classification Search
CPC .......... G06N 3/0445; G06N 3/08; G06T 7/73; G06T 2207/20084; G06T 2207/30176; G06V 10/25; G06V 10/761; G06V 10/7715; G06V 10/82
See application file for complete search history.

(56) References Cited

U.S. PATENT DOCUMENTS

| | | | | |
|---|---|---|---|---|
| 2017/0177462 | A1* | 6/2017 | Huang | G06F 11/3664 |
| 2018/0336471 | A1* | 11/2018 | Rezagholizadeh | G06N 3/088 |
| 2019/0220596 | A1* | 7/2019 | Lie | G06K 9/6267 |
| 2019/0250891 | A1* | 8/2019 | Kumar | G06K 9/6218 |
| 2019/0378274 | A1* | 12/2019 | Garnavi | G06N 3/0472 |
| 2020/0134415 | A1* | 4/2020 | Haidar | G06N 3/02 |
| 2021/0142097 | A1* | 5/2021 | Zheng | G06N 3/08 |

FOREIGN PATENT DOCUMENTS

| | | |
|---|---|---|
| CN | 109522017 A | 3/2019 |
| CN | 109683871 A | 4/2019 |
| CN | 110377282 A | 10/2019 |

OTHER PUBLICATIONS

Niwattanahul et al. (Using of Jaccard Coefficient for Keywords Similarity, published Mar. 15, 2013) (Year: 2013).*
Wang et al. (IRGAN: A Minimax Game for Unifying Generative and Discriminative Information Retrieval Models, published Feb. 22, 2018) (Year: 2018).*
CN105930159A—Image-based interface code generation method and system, published Sep. 7, 2016 (Year: 2016).*
CN109522017A—It is a kind of based on neural network and from the webpage capture code generating method of attention mechanism, published Mar. 26, 2019 (Year: 2019).*
International Search Report and Written Opinion dated Jul. 24, 2020 for corresponding International Application No. PCT/CN2020/085880.

* cited by examiner

Home > Store > T-Shirt

FIG. 7

Get all the best inventions in your e-mail every day. Sign up now!

FIG. 8

☐ Make my profile visible

FIG. 9

Follow

Home > Store > T-Shirt

Get all the best inventions in your e-mail every day. Sign up now!

☐ Make my profile visible

FIG. 10

METHOD FOR GENERATING WEB CODE FOR UI BASED ON A GENERATIVE ADVERSARIAL NETWORK AND A CONVOLUTIONAL NEURAL NETWORK

CROSS-REFERENCE TO RELATED APPLICATIONS

This application is a national stage application filed under 35 U.S.C. 371 based on International Patent Application No. PCT/CN2020/085880, filed on Apr. 21, 2020, which claims priority to Chinese Patent Application No. 201910562411.2, filed with the CNIPA on Jun. 26, 2019, disclosures of which are incorporated herein by reference in their entireties.

TECHNICAL FIELD

The present disclosure belongs to the field of software development and, in particular, relates to a method for generating web codes for a user interface (UI) based on a generative adversarial network (GAN) and a convolutional neural network (CNN).

BACKGROUND

The explosive growth of the scale and complexity of software products makes the rapid development of software more challenging. Particularly in the early stage of software development, the designer designs a prototype diagram and implements the prototype diagram with codes, which is a very heavy workload and is inefficient. Through the research on the automatic generation of software codes, the developer can accelerate the development process, implement software functions more quickly, and finally deliver their software products quickly. It can be seen that the research on the automatic generation of software codes becomes increasingly important.

At present, there are many technologies for automatic code generation, including template-based Freemarker, Extensible Stylesheet Language Transformations (XSLT) and velocity, model-driven model-driven architecture (MDA) and model-driven development (MDD), object-relational-mapping-based object-relational mapping (ORM) and model-view-controller (MVC), document annotation-based Annotation and XDoclet, and agent-dynamic-class-based aspect-oriented programming (AOP), PROXY and ASM. These automatic code generation methods only play a partial auxiliary role in the software development process and cannot replace a certain part of the software development, and thus have a rather limited effect on accelerating the software development. In addition, these automatic code generation methods require learning in related fields first, and then they can be mastered and applied in actual development. As the relatively-high use threshold, these methods are not friendly to most developers for use, so that they have poor universality and cannot be applied to actual development on a large scale.

SUMMARY

The present disclosure aims to provide a low-cost, high-accuracy and wide-application-range method for generating web codes for a user interface (UI).

The technical solution to achieve the object of the present disclosure is a method for generating web codes for a UI based on a generative adversarial network (GAN) and a convolutional neural network (CNN). The method includes steps described below.

In step 1, a mapping relationship between display effects of a HyperText Markup Language (HTML) element and source codes of the HTML element is constructed.

In step 2, object recognition is performed on an image I of the UI to recognize a location of an HTML element in the image I.

In step 3, complete HTML codes of the image I are generated based on the mapping relationship in step 1 and the location of the HTML element in step 2.

In step 4, a similarity $Sim_1$ between manually-written HTML codes and the generated complete HTML codes is obtained for the image I of the UI.

In step 5, a similarity $Sim_2$ between the image I of the UI and an image $I_1$ generated by the generated complete HTML codes is obtained.

In step 6, minimax game is performed on generative networks G in the generative adversarial network (GAN) and discriminative networks D in the GAN to obtain an equilibrium solution from all possible generative networks G and discriminative networks D, so that the generative networks G generate HTML codes having a same distribution as the manually-written HTML codes, where the generative networks G in the GAN are formed by step 2 and step 3, and the discriminative networks D in the GAN are formed by step 4 and step 5; the $Sim_1$ in step 4 and the $Sim_2$ in step 5 are balanced as a $Sim_0$ by the equilibrium solution; whether the $Sim_0$ is greater than a set threshold t is determined; and in a case where the $Sim_0$ is less than t, steps 2 to 5 are repeated; in a case where the $Sim_0$ is not less than t, step 7 is executed.

In step 7, an image-to-HTML-code generation model M is obtained according to a finally obtained generative G and discriminative network D of the GAN after the training in step 6, and inputting a to-be-processed UI image is input into the model M so as to obtain corresponding HTML codes.

The present disclosure is described below in detail in conjunction with the drawings.

DETAILED DESCRIPTION

Figure 1:
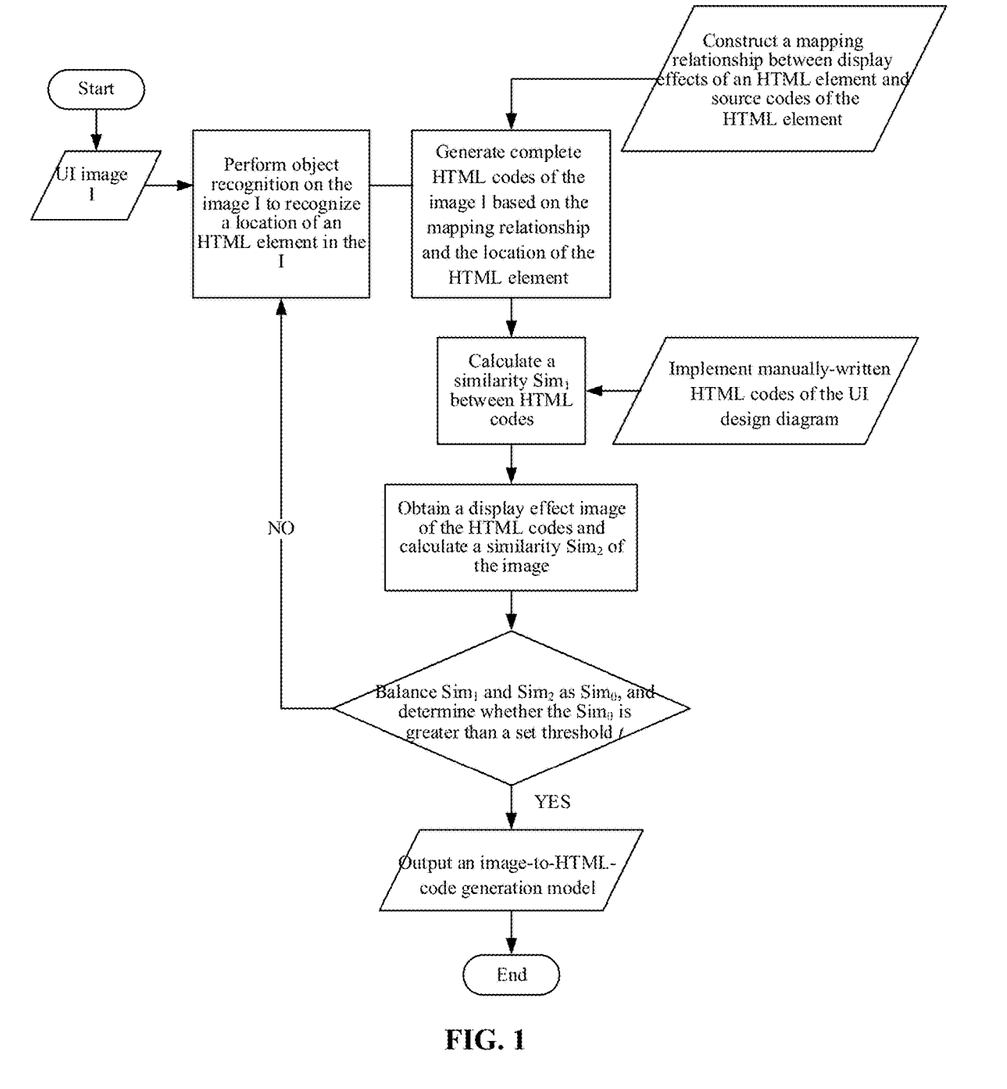
FIG. 1 is a flowchart of a method for generating web codes for a user interface (UI) based on a generative adversarial network (GAN) and a convolutional neural network (CNN) according to the present disclosure.

Referring to FIG. 1, the method for generating web codes for a user interface (UI) based on a generative adversarial network (GAN) and a convolutional neural network (CNN) of the present disclosure includes steps described below.

In step 1, a mapping relationship between display effects of a HyperText Markup Language (HTML) element and source codes of the HTML element is constructed.

In step 2, object recognition is performed on an image I of the UI to recognize a location of an HTML element in the image I.

In step 3, complete HTML codes of the image I are generated based on the mapping relationship in step 1 and the location of the HTML element in step 2.

In step 4, a similarity $Sim_1$ between manually-written HTML codes and the generated complete HTML codes is obtained for the image I of the UI.

In step 5, a similarity Sime between the image I of the UI and an image $I_1$ generated by the generated complete HTML codes is obtained.

In step 6, minimax game is performed on generative networks G in the generative adversarial network (GAN) and discriminative networks D in the GAN to obtain an equilibrium solution from all possible generative networks G and discriminative networks D, so that the generative networks G generate HTML codes having a same distribution as the manually-written HTML codes, where the generative networks G in the GAN are formed by step 2 and step 3, and the discriminative networks D in the GAN are formed by step 4 and step 5; the $Sim_1$ in step 4 and the Sime in step 5 are balanced as a $Sim_0$ by the equilibrium solution; and whether the $Sim_0$ is greater than a set threshold t is determined; in a case where the $Sim_0$ is less than t, steps 2 to 5 are repeated; in a case where the $Sim_0$ is not less than t, step 7 is executed.

In step 7, an image-to-HTML-code generation model M is obtained according to a finally obtained generative G and discriminative network D of the GAN after the training in step 6, and a to-be-processed UI image is input into the model M so as to obtain corresponding HTML codes.

Compared with the related art, the present embodiment has significant advantages. 1) Computer vision technologies are fully used for preforming object recognition processing on a UI image in advance, so as to improve a mapping relationship between display effects of an HTML element and source codes of the HTML element and make the mapping relationship more reliable and accurate. 2) The mapping relationship between display effects of the HTML element and the codes is acquired, and the mapping relationship may be continuously extended, so that the effect of the model of the present disclosure is finally improved, the accuracy of the codes generated for the image is improved, and the application range becomes wider. 3) An image-to-HTML-code conversion model is acquired. When the conversion model is used in practice, as long as a corresponding image is input, the final code results can be obtained. Therefore, some parts in the actual development can be replaced, the actual use cost becomes lower, and the application field becomes wider.

In an embodiment, step 1 specifically includes the step described below. Feature maps of HTML elements are extracted by using the convolutional neural network (CNN), and a one-to-one correspondence is established between the feature maps of the HTML element and HTML codes. Common HTML elements are: Elements (Button, Container, Divider, Flag, Header, Icon, Image, Input, Label, List, Loader, Placeholder, Rail, Reveal, Segment and Step), Collections (Breadcrumb, Form, Grid, Menu, Message and Table), Views (Advertisement, Card, Comment, Feed, Item and Statistic) and Modules (Accordion, Checkbox, Dimmer, Dropdown, Embed, Modal, Popup, Progress, Rating, Search, Shape, Sidebar, Sticky, Tab and Transition).

In an embodiment, step 2 in which the object recognition is performed on the image I of the UI to recognize the location of the HTML element in the image I specifically includes steps described below.

In step 2-1, a feature map of the image I of the UI is extracted by using the convolutional neural network (CNN). Step 2-1 specifically includes the step described below. The feature map is extracted by using a convolution layer, a pooling layer and a Rectified Linear Unit (ReLU) layer, and edge extension is performed during multiple times of convolution to ensure that a size of an input matrix and a size of an output matrix do not change after the multiple times of convolution.

In step 2-2, an object proposal region is generated by using a region proposal network (RPN).

In step 2-3, a proposal feature map corresponding to the object proposal region is extracted by a region of interest (ROI) pooling layer of the pooling layer.

In step 2-4, a final accurate location of the object proposal region, that is, the location of the HTML element in the image I of the UI, is detected by a classification layer and based on the proposal feature map corresponding to the object proposal region.

In an embodiment, step 2-2 in which the object proposal region is generated by using the region proposal network (RPN) specifically includes steps described below.

In step 2-2-1, $$\text{ceil}\left(\frac{\text{a width of an original image}}{SW}\right) \times \text{ceil}\left(\frac{\text{a height of the original image}}{SH}\right) \times Z$$

proposal anchors are set in the original image I, where SW represents a scale of the width of the original image, SH represents a scale of the height of the original image, and Z is an integer.

In step 2-2-2, which anchors are foreground points having an object and which anchors are background points having no object are determined by using the CNN.

In step 2-2-3, bounding box regression processing is performed on the foreground points having the object so as to obtain an object proposal region corresponding to the foreground points having the object. Exemplarily, SW=16, SH=16, and Z=9.

In an embodiment, step 2-3 in which the proposal feature map corresponding to the object proposal region is extracted by the ROI pooling layer in the pooling layer specifically includes steps described below.

It is assumed that a size of the object proposal region is M×N, and a scale of the object proposal region is SW×SH.

$$\left(\frac{M}{SW}\right) \times \left(\frac{N}{SH}\right).$$

In step 2-3-1, a dimension of the object proposal region is mapped to

In step 2-3-2, a feature map region corresponding to the dimension-mapped object proposal region is horizontally divided into grid cells each of which has a size of pooled$_w$× pooled$_h$.

In step 2-3-3, max pooling processing is performed on a feature map in each of the grid cells so as to obtain the proposal feature map corresponding to the object proposal region.

In an embodiment, step 2-4 in which the final accurate location of the object proposal region, that is, the location of the HTML element in the image I of the UI, is detected by the classification layer and based on the proposal feature map corresponding to the object proposal region includes steps described below.

In step 2-4-1, for each of the proposal feature map, which HTML element a respective object proposal region belongs to is calculated through a fully connected layer and a softmax classifier to obtain a rough location of the respective object proposal region, and a probability vector of the rough location is output.

In step 2-4-2, based on the probability vector, a location offset of the respective object proposal region is obtained by using the bounding box regression method to regress to a more accurate object region.

Further, step 3 in which the complete HTML codes of the image I are generated based on the mapping relationship in step 1 and the location of the HTML element in step 2 specifically includes steps described below.

In step 3-1, a feature map corresponding to an object proposal region whose accurate location is obtained in step 2 is extracted by using the CNN.

In step 3-2, based on the mapping relationship in step 1, HTML codes corresponding to the feature map in step 3-1 are matched according to a value of the feature map in step 3-1 so as to obtain HTML codes corresponding to all of HTML elements in the image I.

In step 3-3, all HTML code blocks are combined to generate the final complete HTML codes.

Further, step 4 in which the similarity Sim$_1$ between the manually-written HTML codes and the generated complete HTML codes is calculated for the image I of the UI specifically includes steps described below.

In step 4-1, a set S$_1$ of attribute class values in the manually-written HTML codes and a set S$_2$ of attribute class values in the generated complete HTML codes are respectively extracted.

In step 4-2, the similarity Sim$_1$ is obtained by using a Jaccard coefficient through the following formula:

$$Sim_1 = J(S_1, S_2) \frac{s_1 \cap s_2}{s_1 \cup s_2}.$$

S$_1$ represents the set of the attribute class values in the manually-written HTML codes, and S$_2$ represents the set of the attribute class values in the generated HTML codes.

Exemplarily, the image I$_1$ is generated by the generated complete HTML codes in step 5 includes two manners described below.

The generated complete HTML codes are run by using a modern standard browser, and a screenshot of display results is taken to obtain the I$_1$.

Alternatively, the I$_1$ is obtained by rendering the generated complete HTML codes by using an imgkit package of Python.

Exemplarily, step 5 in which the similarity Sim$_2$ between the image I of the UI and the image I$_1$ generated by the generated complete HTML codes is obtained in step 5 specifically includes the step described below. The similarity Sim$_2$ is obtained based on a histogram, image template matching and perceptual hashing algorithm of image similarity algorithms.

Embodiment

The method for generating web codes for a UI based on a generative adversarial network (GAN) and a convolutional neural network (CNN) of the present disclosure includes contents described below.

In step 1, a mapping relationship between display effects of an HTML element and source codes of the HTML element is constructed. Step 1 specifically includes the step described below.

Feature maps of HTML elements are extracted by using the CNN, and a one-to-one correspondence is established between the feature maps of the HTML element and HTML codes.

Common HTML elements include Elements (Button, Container, Divider, Flag, Header, Icon, Image, Input, Label, List, Loader, Placeholder, Rail, Reveal, Segment and Step), Collections (Breadcrumb, Form, Grid, Menu, Message and Table), views (Advertisement, Card, Comment, Feed, Item and Statistic) and Modules (Accordion, Checkbox, Dimmer, Dropdown, Embed, Modal, Popup, Progress, Rating, Search, Shape, Sidebar, Sticky, Tab and Transition).

Figure 2:
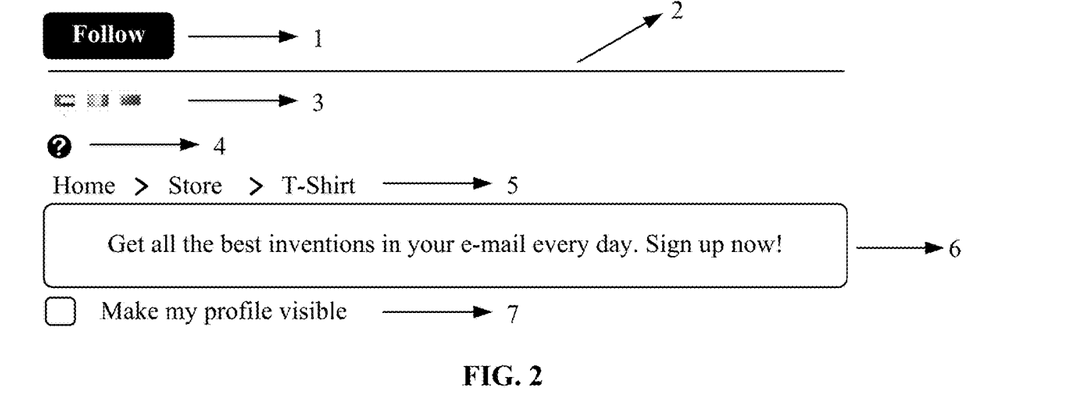
FIG. 2 is an input web design diagram demo1.png according to an embodiment of the present disclosure.

In the embodiment, an input web design diagram demo1.png is shown in FIG. 2. In the embodiment, the one-to-one mapping relationship of Button, Divider, Flag, Icon, Breadcrumb, Message and Checkbox is defined as shown in Table 1 below.

TABLE 1

Mapping relationship between HTML element codes and display effects of the HTML element

| Number | HTML elements | Images | Codes |
| --- | --- | --- | --- |
| 1 | Button | Number 1 in FIG. 2 | <button class="ui button">Follow</button> |
| 2 | Divider | Number 2 in FIG. 2 | <div class="ui divider"></div> |
| 3 | Flag | Number 3 in FIG. 2 | <i class="ae flag"></i><br><i class="france flag"></i><br><i class="myanmar flag"></i> |

TABLE 1-continued

Mapping relationship between HTML element codes and display effects of the HTML element

| Number | HTML elements | Images | Codes |
|---|---|---|---|
| 4 | Icon | Number 4 in FIG. 2 | <i class="question circle icon"></i> |
| 5 | Breadcrumb | Number 5 in FIG. 2 | <div class="ui breadcrumb"><br><a class="section">Home</a><br><i class="right angle icon divider"></i><br><a class="section">Store</a><br><i class="right angle icon divider"></i><br><div class="active section">T-shirt</div><br></div> |
| 6 | Message | Number 6 in FIG. 2 | <div class="ui compact message"><br><p>Get all the best inventions in your e-mail everday. Sign up now!</p><br></div> |
| 7 | Checkbox | Number 7 in FIG. 2 | <div class="ui checkbox"><br><input type="checkbox" name="example"><br><label>Make my profile visible</label><br></div> |

In step 2, object recognition is performed on an image 1 to recognize a location of an HTML element in the image 1. Step 2 specifically includes steps described below.

In step 2-1, a feature map of the image 1 of the UI is extracted by using the CNN. Step 2-1 specifically includes the step described below. The feature map is extracted by using a convolution layer, a pooling layer and a Rectified Linear Unit (ReLU) layer, and edge extension is performed during multiple times of convolution to ensure that a size of an input matrix and a size of an output matrix do not change after the multiple times of convolution.

In step 2-2, an object proposal region is generated by using a region proposal network (RPN).

In step 2-2-1, $$\text{ceil}\left(\frac{\text{a width of an original image}}{SW}\right) \times \text{ceil}\left(\frac{\text{a height of the original image}}{SH}\right) \times 9$$

proposal anchors are set in the image 1.

In step 2-2-2, which anchors are foreground points having an object and which anchors are background points having no object are determined by using the CNN.

In step 2-2-3, bounding box regression processing is performed on the foreground points having the object so as to obtain an object proposal region corresponding to the foreground points having the object.

In step 2-3, a proposal feature map corresponding to the object proposal region is extracted by an ROI pooling layer in the pooling layer.

It is assumed that a size of the object proposal region is M×N.

In step 2-3-1, a dimension of the object proposal region is mapped to $$\left(\frac{M}{16}\right) \times \left(\frac{N}{16}\right).$$

In step 2-3-2, a feature map region corresponding to the dimension-mapped object proposal region is horizontally divided into grid cells each of which has a size of pooled$_w$× pooled$_h$.

In step 2-3-3, max pooling processing is performed on a feature map in each of the grid cells so as to obtain the proposal feature map corresponding to the object proposal region.

In step 2-4, a final accurate location of the object proposal region is detected by a classification layer, that is, which HTML element a respective object proposal region belongs to is calculated through a fully connected layer and a softmax classifier by using the obtained feature map, and a probability vector cls_prob is output. At the same time, a location offset bbox_pred of the respective object proposal region is obtained by using the bounding box regression method again for regression of a more accurate object region.

In the embodiment, the finally obtained object images are shown in Table 2 below.

TABLE 2

Recognized object images

| Number | Object images |
|---|---|
| 1 | Image 3 |
| 2 | Image 4 |
| 3 | Image 5 |
| 4 | Image 6 |
| 5 | Image 7 |
| 6 | Image 8 |
| 7 | Image 9 |

In step 3, complete HTML codes of the image 1 are generated based on the mapping relationship in step 1 and the location of the HTML element in step 2.

According to the object images in Table 2 above, codes are searched for in the mapping relationship in Table 1, and the codes are obtained as shown in Table 3 below.

TABLE 3

Codes corresponding to object images

Figure 3:
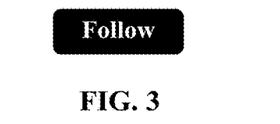
FIG. 3 is a Button object diagram after object recognition is performed on demo1.png according to an embodiment of the present disclosure.
Figure 4:
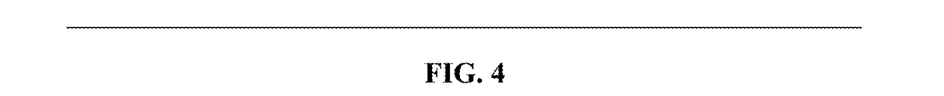
FIG. 4 is a Divider object diagram after object recognition is performed on demo1.png according to an embodiment of the present disclosure.
Figure 5:
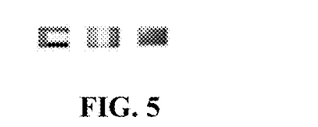
FIG. 5 is a Flag object diagram after object recognition is performed on demo1.png according to an embodiment of the present disclosure.

| Object images | Codes |
|---|---|
| FIG. 3 | <button class="ui button">Follow</button> |
| FIG. 4 | <div class="ui divider"></div> |
| FIG. 5 | <i class="ae flag"></i><br><i class="france flag"></i><br><i class="myanmar flag"></i> |

TABLE 3-continued

Codes corresponding to object images

Figure 6:
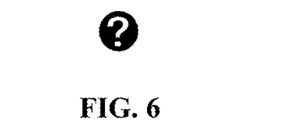
FIG. 6 is an Icon object diagram after object recognition is performed on demo1.png according to an embodiment of the present disclosure.
Figure 7:
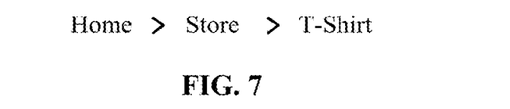
FIG. 7 is a Breadcrumb object diagram after object recognition is performed on demo1.png according to an embodiment of the present disclosure.
Figure 8:
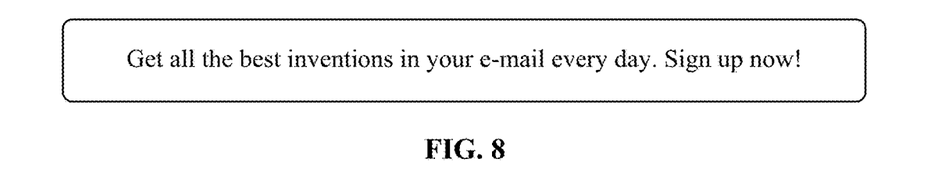
FIG. 8 is a Message object diagram after object recognition is performed on demo1.png according to an embodiment of the present disclosure.
Figure 9:
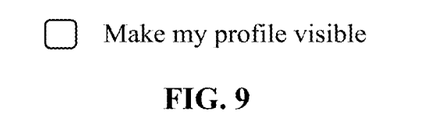
FIG. 9 is a Checkbox object diagram after object recognition is performed on demo1.png according to an embodiment of the present disclosure.

| Object images | Codes |
|---|---|
| FIG. 6 | \<i class="question circle icon"\>\</i\> |
| FIG. 7 | \<div class="ui breadcrumb"\><br>  \<a class="section"\>Home\</a\><br>  \<i class="right angle icon divider"\>\</i\><br>  \<a class="section"\>Store\</a\><br>  \<i class="right angle icon divider"\>\</i\><br>  \<div class="active section"\>T-shirt\</div\><br>\</div\> |
| FIG. 8 | \<div class="ui compact message"\><br>  \<p\>Get all the best inventions in your<br>  e-mail every day. Sign up now!\</p\><br>\</div\> |
| FIG. 9 | \<div class="ui checkbox"\><br>  \<input type="checkbox" name="example" /\><br>  \<label\>Make my profile visible\</label\><br>\</div\> |

The above codes are stitched to obtain following complete codes demo2.html:

```
<body>
  <button class="ui button">Follow</button>
  <div class="ui divider"></div>
  <div>
    <i class="ae flag"></i>
    <i class="france flag"></i>
    <i class="myanmar flag"></i>
  </div>
  <div>
    <i class="question circle icon"></i>
  </div>
  <div class="ui breadcrumb">
    <a class="section">Home</a>
    <i class="right angle icon divider"></i>
    <a class="section">Store</a>
    <div class="active section">T-Shirt</div>
```

```
  </div>
  <div>
    <div class="ui compact message">
      <p>
        Get all the best inventions in your e-mail every day. Sign up
        now!
      </p>
    </div>
  </div>
  <div>
    <div class="ui checkbox">
      <input type="checkbox" name="example" />
      <label>Make my profile visible</label>
    </div>
  </div>
</body>.
```

In step 4, a similarity $Sim_1$ between manually-written HTML codes demo1.html and the generated complete HTML codes demo2.html is obtained for the image 1. Step 4 specifically includes steps described below.

In step 4-1, a set $S_1$ of attribute class values in the manually-written HTML codes and a set $S_2$ of attribute class values in the generated complete HTML codes are respectively extracted.

In step 4-2, the similarity $Sim_1$ is obtained by using a Jaccard coefficient through the following formula:

$$Sim_1 = J(S_1, S_2)\frac{s_1 \cap s_2}{s_1 \cup s_2}.$$

$S_1$ represents the set of the attribute class values in the manually-written HTML codes, and $S_2$ represents the set of the attribute class values in the generated HTML codes.

In the embodiment, the manually-written HTML codes demo1.html are:

```
<!DOCTYPE html>
<html lang="en">
  <head>
    <meta charset="UTF-8" />
    <meta name="viewport" content="width=device-width, initial-scale=1.0" />
    <meta http-equiv="X-UA-Compatible" content="ie=edge" />
    <title>Document</title>
    <link
      rel="stylesheet"
      href="https://cdn.jsdelivr.net/npm/semantic-ui@2.4.2/dist/semantic.min.css"
    />
    <script src="https://cdn.jsdelivr.net/npm/semantic-ui@2.4.2/dist/semantic.min.js"></script>
  </head>
  <body>
    <button class="ui button">Follow</button>
    <div class="ui divider"></div>
    <div>
      <i class="ae flag"></i>
      <i class="france flag"></i>
      <i class="myanmar flag"></i>
    </div>
    <div>
      <i class="question circle icon"></i>
    </div>
    <div class="ui breadcrumb">
      <a class="section">Home</a>
      <i class="right angle icon divider"></i>
      <a class="section">Store</a>
      <i class="right angle icon divider"></i>
      <div class="active section">T-Shirt</div>
    </div>
    <div>
      <div class="ui compact message">
```

-continued

```
    <p>
        Get all the best inventions in your e-mail every day. Sign up now!
    </p>
   </div>
  </div>
  <div>
    <div class="ui checkbox">
        <input type="checkbox" name="example" />
        <label>Make my profile visible</label>
    </div>
  </div>
 </body>
</html>.
```

From the above, it can be obtained that:

$S_1$={"ui button", "ui divider", "ae flag", "france flag", "myanmar flag", "question circle icon", "ui breadcrumb", "section", "right angle icon divider", "section", "right angle icon divider", "active section", "ui compact message", "ui checkbox", };

$S_2$={"ui button", "ui divider", "ae flag", "france flag", "myanmar flag", "question circle icon", "ui breadcrumb", "section", "right angle icon divider", "section", "right angle icon divider", "active section", "ui compact message", "ui checkbox", }.

In this way, it can be obtained that the similarity $Sim_1$ satisfies that $$Sim_1 = J(S_1, S_2) \frac{s_1 \cap s_2}{s_1 \cup s_2} = 100\%.$$

In step 5, a similarity $Sim_2$ between the image 1 of the UI and an image generated by the generated complete HTML codes is obtained. Step 5 specifically includes steps described below.

The method for generating the image by the generated complete HTML codes is described below. The generated complete HTML codes are run by using a modern standard browser, and a screenshot of display results is taken; or, the generated complete HTML codes are rendered by using an imgkit package of Python.

Figure 10:
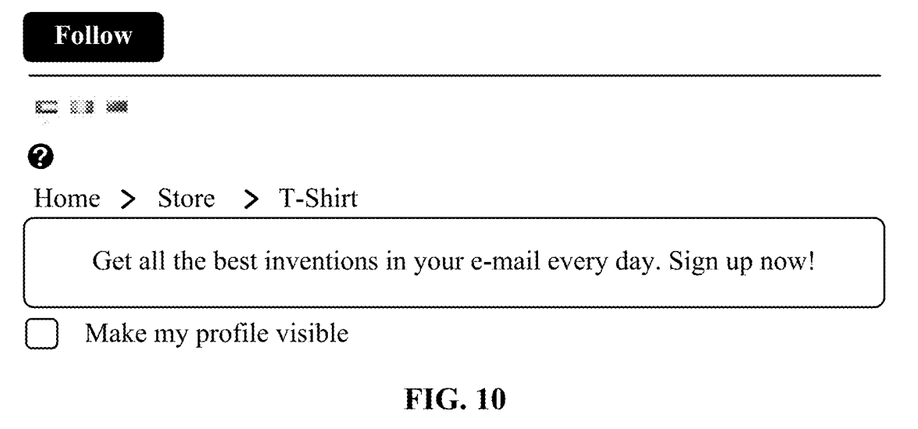
FIG. 10 is a screenshot after demo2.html is run according to an embodiment of the present disclosure.

The similarity $Sim_2$ is obtained based on a histogram, image template matching and perceptual hashing algorithm of image similarity algorithms. In the embodiment, the codes demo1.html are run, and the display effect of the codes are saved as shown in FIG. 10, and the $Sim_2$ between the image 1 and FIG. 10 is obtained as 100%.

In step 6, minimax game is performed on generative networks G in the generative adversarial network (GAN) and discriminative networks D in the GAN to obtain an equilibrium solution from all possible generative networks G and generative networks D, so that the generative networks G generate HTML codes having a same distribution as the manually-written HTML codes, where the generative networks G in the GAN are formed by step 2 and step 3, and the discriminative networks D in the GAN are formed by step 4 and step 5; the $Sim_1$ and the $Sim_2$ are balanced as a $Sim_0$ by the equilibrium solution; whether the $Sim_0$ is greater than a set threshold t is determined; and in a case where the $Sim_0$ is less than t, steps 2 to 5 are repeated; in a case where the $Sim_0$ is not less than t, step 7 is executed.

In the embodiment, t is set to 95%; and $Sim_1$=100% and $Sim_2$=100%, so that the balanced $Sim_0$ is obtained as 100%.

At this time, $Sim_0$=100% and t=95%, so that $Sim_0$ is greater than t, and the next step is executed.

In step 7, an image-to-HTML-code generation model M is obtained according to a finally obtained generative G and discriminative network D of the GAN after the training in step 6, and a to-be-processed UI image is input into the model M so as to obtain corresponding HTML codes.

According to the method of the present disclosure, an image-to-HTML-code generation model M can be obtained. A to-be-processed UI image is input into the model, and then corresponding HTML codes can be generated. Therefore, the model has stronger universality and generality and can replace some parts in the actual development, and thus the actual use cost is lower and the application field is wider.

What is claimed is:

1. A method for generating web codes for a user interface (UI) based on a generative adversarial network (GAN) and a convolutional neural network (CNN), comprising:
    step 1: constructing a mapping relationship between display effects of a HyperText Markup Language (HTML) element and source codes of the HTML element;
    step 2: performing object recognition on an image I of the UI to recognize a location of an HTML element in the image I;
    step 3: generating complete HTML codes of the image I based on the mapping relationship in step 1 and the location of the HTML element in step 2;
    step 4: obtaining, for the image I of the UI, a similarity $Sim_1$ between manually-written HTML codes and the generated complete HTML codes;
    step 5: obtaining a similarity $Sim_2$ between the image I of the UI and an image $I_1$ generated by the generated complete HTML codes;
    step 6: performing minimax game on generative networks G in the GAN and discriminative networks D in the GAN to obtain an equilibrium solution from all possible generative networks G and discriminative networks D, so that the generative networks G generate HTML codes having a same distribution as the manually-written HTML codes, wherein the generative networks G in the GAN are formed by step 2 and step 3, and the discriminative networks D in the GAN are formed by step 4 and step 5;
    balancing, by the equilibrium solution, the $Sim_1$ in step 4 and the $Sim_2$ in step 5 as a $Sim_0$; determining whether the $Sim_0$ is greater than a set threshold t, and in a case where the $Sim_0$ is less than t, repeating steps 2 to 5, in a case where the $Sim_0$ is not less than t, executing step 7; and
    step 7: obtaining an image-to-HTML-code generation model M according to a finally obtained generative G and discriminative network D of the GAN after the training in step 6, and inputting a to-be-processed UI image into the model M so as to obtain corresponding HTML codes.

2. The method for generating the web codes for the UI based on the GAN and the CNN according to claim 1, wherein step 1 of constructing the mapping relationship between the display effects of the HTML element and the source codes of the HTML element comprises: extracting feature maps of HTML elements by using the CNN, and establishing a one-to-one correspondence between the feature maps of the HTML element and HTML codes.

3. The method for generating the web codes for the UI based on the GAN and the CNN according to claim 1, wherein step 2 of performing the object recognition on the image I of the UI to recognize the location of the HTML element in the image I comprises:
step 2-1: extracting a feature map of the image I of the UI by using the CNN, comprising: extracting the feature map by using a convolution layer, a pooling layer and a Rectified Linear Unit (ReLU) layer, and performing edge extension during multiple times of convolution to ensure that a size of an input matrix and a size of an output matrix do not change after the multiple times of convolution;
step 2-2: generating an object proposal region by using a region proposal network (RPN);
step 2-3: extracting, by a region of interest (ROI) pooling layer in the pooling layer, a proposal feature map corresponding to the object proposal region; and
step 2-4: detecting, by a classification layer and based on the proposal feature map corresponding to the object proposal region, a final location of the object proposal region, that is, the location of the HTML element in the image I of the UI.

4. The method for generating the web codes for the UI based on the GAN and the CNN according to claim 3, wherein step 2-2 of generating the object proposal region by using the RPN comprises:
step 2-2-1: setting $$\text{ceil}\left(\frac{\text{a width of an original image}}{SW}\right) \times \text{ceil}\left(\frac{\text{a height of the original image}}{SH}\right) \times Z$$

proposal anchors in the image I, wherein SW represents a scale of the width of the original image, SH represents a scale of the height of the original image, and Z is an integer;
step 2-2-2: determining, by using the CNN, which anchors are foreground points having an object and which anchors are background points having no object; and
step 2-2-3: performing bounding box regression processing on the foreground points having the object so as to obtain an object proposal region corresponding to the foreground points having the object.

5. The method for generating the web codes for the UI based on the GAN and the CNN according to claim 4, wherein step 2-3 of extracting, by the ROI pooling layer in the pooling layer, the proposal feature map corresponding to the object proposal region comprises:
it is assumed that a size of the object proposal region is M×N, and a scale of the object proposal region is SW×SH;

step 2-3-1: mapping a dimension of the object proposal region to $$\left(\frac{M}{SW}\right) \times \left(\frac{N}{SH}\right);$$

step 2-3-2: horizontally dividing a feature map region corresponding to the dimension-mapped object proposal region into grid cells each of which has a size of $pooled_w \times pooled_h$; and
step 2-3-3: performing max pooling processing on a feature map in each of the grid cells so as to obtain the proposal feature map corresponding to the object proposal region.

6. The method for generating the web codes for the UI based on the GAN and the CNN according to claim 5, wherein step 2-4 of detecting, by the classification layer and based on the proposal feature map corresponding to the object proposal region, the final accurate location of the object proposal region, that is, the location of the HTML element in the image I of the UI comprises:
step 2-4-1: calculating, for each of the proposal feature map, which HTML element a respective object proposal region belongs to through a fully connected layer and a softmax classifier to obtain a rough location of the respective object proposal region, and outputting a probability vector of the rough location; and
step 2-4-2: obtaining, based on the probability vector, a location offset of the respective object proposal region by using the bounding box regression processing to regress to a more accurate object region.

7. The method for generating the web codes for the UI based on the GAN and the CNN according to claim 1, wherein step 3 of generating the complete HTML codes of the image I based on the mapping relationship in step 1 and the location of the HTML element in step 2 comprises:
step 3-1: extracting, by using the CNN, a feature map corresponding to an object proposal region whose accurate location is obtained in step 2;
step 3-2: matching, based on the mapping relationship in step 1, HTML codes corresponding to the feature map in step 3-1 according to a value of the feature map in step 3-1 so as to obtain HTML codes corresponding to all of HTML elements in the image I; and
step 3-3: combining the HTML codes corresponding to all of the HTML elements to generate the final complete HTML codes.

8. The method for generating the web codes for the UI based on the GAN and the CNN according to claim 1, wherein step 4 of obtaining the similarity $Sim_1$ between the manually-written HTML codes and the generated complete HTML codes for the image I of the UI comprises:
step 4-1: extracting a set $S_1$ of attribute class values in the manually-written HTML codes and a set $S_2$ of attribute class values in the generated complete HTML codes respectively; and
step 4-2: obtaining the similarity $Sim_1$ by using a Jaccard coefficient through the following formula:

$$Sim_1 = J(S_1, S_2) \frac{s_1 \cap s_2}{s_1 \cup s_2},$$

wherein $S_1$ represents the set of the attribute class values in the manually-written HTML codes, and $S_2$ represents the set of the attribute class values in the generated HTML codes.

9. The method for generating the web codes for the UI based on the GAN and the CNN according to claim 1, wherein generating the image $I_1$ by the generated complete HTML codes in step 5 comprises:
running the generated complete HTML codes by using a modern standard browser, and taking a screenshot of display results to obtain the $I_1$; or
obtaining the $I_1$ by rendering the generated complete HTML codes by using an imgkit package of Python.

10. The method for generating the web codes for the UT based on the GAN and the CNN according to claim 1, wherein step 5 of obtaining the similarity $Sim_2$ between the image I of the UT and the image $I_1$ generated by the generated complete HTML codes comprises: obtaining the similarity $Sim_2$ based on a histogram, image template matching and perceptual hashing algorithm of image similarity algorithms.

11. The method for generating the web codes for the UT based on the GAN and the CNN according to claim 2, wherein step 2 of performing the object recognition on the image I of the UT to recognize the location of the HTML element in the image I comprises:
step 2-1: extracting a feature map of the image I of the UT by using the CNN, comprising: extracting the feature map by using a convolution layer, a pooling layer and a Rectified Linear Unit (ReLU) layer, and performing edge extension during multiple times of convolution to ensure that a size of an input matrix and a size of an output matrix do not change after the multiple times of convolution;
step 2-2: generating an object proposal region by using a region proposal network (RPN);
step 2-3: extracting, by a region of interest (ROI) pooling layer in the pooling layer, a proposal feature map corresponding to the object proposal region; and
step 2-4: detecting, by a classification layer and based on the proposal feature map corresponding to the object proposal region, a final location of the object proposal region, that is, the location of the HTML element in the image I of the UI.

12. The method for generating the web codes for the UT based on the GAN and the CNN according to claim 9, wherein step 5 of obtaining the similarity $Sim_2$ between the image I of the UI and the image $I_1$ generated by the generated complete HTML, codes comprises: obtaining the similarity Sime based on a histogram, image template matching and perceptual hashing algorithm of image similarity algorithms.

* * * * *